US010392911B1

(12) United States Patent
Yee (10) Patent No.: US 10,392,911 B1
(45) Date of Patent: Aug. 27, 2019

(54) IN-SITU CARBON DIOXIDE GENERATION FOR HEAVY OIL RECOVERY METHOD

(71) Applicant: Husky Oil Operations Limited, Calgary (CA)

(72) Inventor: Paul W. F. Yee, Calgary (CA)

(73) Assignee: Husky Oil Operations Limited, Calgary (CA)

( * ) Notice: Subject to any disclaimer, the term of this patent is extended or adjusted under 35 U.S.C. 154(b) by 0 days.

(21) Appl. No.: 16/378,907

(22) Filed: Apr. 9, 2019

Related U.S. Application Data

(62) Division of application No. 16/118,823, filed on Aug. 31, 2018, now Pat. No. 10,337,304.

(30) Foreign Application Priority Data

Aug. 30, 2018 (CA) ...................................... 3015994

(51) Int. Cl.
*E21B 43/16* (2006.01)
*C09K 8/594* (2006.01)
*C09K 8/72* (2006.01)

(52) U.S. Cl.
CPC ............ *E21B 43/164* (2013.01); *C09K 8/594* (2013.01); *C09K 8/72* (2013.01)

(58) Field of Classification Search
CPC .......... E21B 43/164; C09K 8/594; C09K 8/72
USPC ....................................................... 166/300
See application file for complete search history.

(56) References Cited

U.S. PATENT DOCUMENTS

| | | |
|---|---|---|
| 2,623,596 A | 12/1952 | Whorton et al. |
| 3,532,165 A | 10/1970 | Raifsnider |
| 4,415,032 A | 11/1983 | Shu |
| 4,441,555 A | 4/1984 | Shu |
| 4,683,948 A | 8/1987 | Fleming |
| 4,762,178 A | 8/1988 | Falls et al. |
| 4,846,276 A | 7/1989 | Haines |
| 4,921,576 A | 5/1990 | Hurd |

(Continued)

OTHER PUBLICATIONS

Al-Jarba, M., et al., "A Comparison Study of the $CO_2$-Oil Physical Properties Literature Correlations Accuracy using Visual Basic Modelling Technique," Oil and Gas Business, 2009, 17 pgs.

(Continued)

*Primary Examiner* — William D Hutton, Jr.
*Assistant Examiner* — Ashish K Varma
(74) *Attorney, Agent, or Firm* — Frost Brown Todd LLC (57) ABSTRACT

A method for recovery of oil housed in a reservoir comprising injecting an aqueous solution or slurry of a carbonate salt into a wellbore and allowing the aqueous solution or slurry of the carbonate salt to enter into the reservoir. An aqueous solution of an acid is then injected into the wellbore and allowed to enter into the reservoir. The carbonate salt and the acid are allowed to react with each other and form carbon dioxide ($CO_2$) gas, inside the reservoir, which mixes with the reservoir oil and thereby reduces the viscosity of the oil within the reservoir. The method also provides for a rapid effervescence of carbon dioxide that may enhance oil recovery by improving oil flow to the wellbore by increasing reservoir pressure, increasing rock permeability from sand production, causing oil swelling, inducing foamy oil creation and/or removing formation skin damage.

6 Claims, 7 Drawing Sheets

(56) References Cited

U.S. PATENT DOCUMENTS

| | | | | |
|---|---|---|---|---|
| 2008/0078549 | A1* | 4/2008 | Moorehead | C09K 8/74 166/282 |
| 2014/0231080 | A1* | 8/2014 | Sanders | E21B 43/40 166/267 |
| 2014/0338903 | A1* | 11/2014 | Mahmoud | E21B 43/20 166/279 |
| 2016/0280986 | A1* | 9/2016 | Xu | C09K 8/602 |

OTHER PUBLICATIONS

Alshiviakhy, A., et al., "Foaminess and Viscosity Effects in Heavy Oil Flow," CSUP/SPE 145231, Canadian Unconventional Resources Conference, Nov. 15-17, 2011, Calgary, Alberta, Canada, 15 pgs.

Chung, F.T.H., et al., "Measurments and Correlations of the Physical Properties of $CO_2$/Heavy-Crude-Oil Mixtures," SPE Reservoir Engineering, Aug. 1988, pp. 822-828, 7 pgs.

Dong, Y., et al., "Carbonated Water Flood: What We Observed in Sand Pack Experiments," SCA2011-34, International Symposium of the Society of Core Analysts, Sep. 18-21, 2011, Austin, UX, USA, 12 pgs.

Gerardi, M.H. "Carbon Dioxide, Alkalinity and pH," PowerPoint Presentation, School of Ocean and Earth Science and Technology, Course materials, OCN 623—Chemical Oceanography, 2012, 17 pgs.

Hangx, S.J.T., "Subsurface mineralisation: Rate of CO2 mineralisation and Geomechanical effects on host and seal formations. Behaviour of the $CO_2$—$H_2O$ system and preliminary mineralisation model and experiments," Department of Earth Sciences, Utrecht University, Dec. 2005, 43 pgs.

Maini, B.B., "Foamy Oil Flow in Primary Production of Heavy Oil under Solution Gas Drive," SPE 56541, 1999 SPE Annual Technical Conference and Exhibition, Oct. 3-6, 1999, Houston, TX, USA, 10 pgs.

Sawatzky, R.P., et al., "Tracking Cold Production Footprints," Paper 2002-086, Petroleum Society's Canadian International Petroleum Conference, Jun. 11-13, 2002, Calgary, Alberta, Canada, 16 pgs.

Wang, S., et al., "Carbon Dioxide in Situ Generation for Enhanced Oil Recovery," CMTC-486365-MS, Carbon Managment Technology Conference, Jul. 17-20, 2017, Houston, TX, USA, 9 pgs.

Wang, S., et al., "In-situ $CO_2$ generation for EOR by using urea as a gas agent," Fuel, 2018, 217:499-507, 9 pgs.

U.S. Appl. No. 16/118,823, entitled "In-Situ Carbon Dioxide Generation for Heavy Recovery Oil Method," filed Aug. 31, 2018.

* cited by examiner

$$CO_{2(g)} \leftrightarrow CO_{2(aq)} + H_2O \leftrightarrow HCO_3^- + H^+$$
$$HCO_3^- \leftrightarrow CO_3^{-2} + H^+$$

IN-SITU CARBON DIOXIDE GENERATION FOR HEAVY OIL RECOVERY METHOD

CROSS-REFERENCE TO RELATED APPLICATION

This application claims priority to and benefit of U.S. patent application Ser. No. 16/118,823, entitled "In-Situ Carbon Dioxide Generation for Heavy Oil Recovery Method," filed Aug. 31, 2018, which claims priority to and benefit of CA Serial No. 3,015,994, filed Aug. 30, 2018, the contents of each are incorporated by reference in their entirety for all purposes.

FIELD OF THE INVENTION

The present invention relates to oil recovery methods, and more specifically to methods for enhancing oil recovery from unconsolidated and consolidated reservoirs.

BACKGROUND

It is known in the art of oil recovery, and particularly in the enhanced recovery of oil from subsurface reservoirs, to employ the use of a downhole injected gas for increasing the amount of oil that can be produced from a reservoir. At times, this process is referred to as enhanced oil recovery (EOR) or tertiary recovery (as opposed to primary and secondary recovery).

Enhanced oil recovery using carbon dioxide gas is a well understood and publicized technology that involves injecting carbon dioxide gas into a reservoir. The special properties of carbon dioxide allow its EOR application in light, medium and heavy oil reservoirs in either of miscible or immiscible modes.

Injected carbon dioxide is known to dissolve readily in oil and reduce the viscosity of oil housed in a reservoir, thus allowing the oil to flow into a producing well and thereby be produced to surface. Furthermore, reservoir injected carbon dioxide can maintain reservoir pressure and improve oil displacement because the interfacial tension between oil and rock matrix is reduced. Typically, current commercial carbon dioxide enhanced oil recovery is conducted by injecting gaseous carbon dioxide under very high pressures (>13,000 kPa) into light to medium density oil (>22.3° API) bearing reservoirs at depths greater than 1,300 meter. High injection pressures are required to force the carbon dioxide gas to completely dissolve into the oil as a solvent thereby reducing oil viscosity and residual oil saturation.

There are, however, known drawbacks to using carbon dioxide for EOR or other projects involving oil recovery. For example, it has long been recognized that there can be limited access to high purity carbon dioxide gas at a reasonable price. Furthermore, a high initial capital investment is required to store, transport and inject high pressure gaseous and liquid carbon dioxide. Large scale carbon dioxide EOR projects require a reliable source of carbon dioxide, at a reasonable cost, either from a nearby natural carbon dioxide source or a nearby facility that collects and captures carbon dioxide. Small scale carbon dioxide EOR projects typically do not have access to such cost effective resources.

Another drawback when using carbon dioxide for conventional EOR is that diffusion of carbon dioxide gas into oil is typically a slow process. It is believed, however, that carbon dioxide gas generated inside a reservoir may allow for effervescence that can induce convectional mixing that increases the rate of carbon dioxide gas diffusion into oil.

U.S. patent application Ser. No. 13/898,438 to Mahmoud addresses some of the drawbacks of using carbon dioxide for EOR discussed above, by injecting a polyamino carboxylic acid chelating agent into a carbonate rock matrix reservoir allowing for the in situ generation of carbon dioxide. The process contemplated by Mahmoud, however, is only applicable and limited to reservoirs comprising carbonate rock as the carbon dioxide is sourced from the carbonate rock itself.

The use of carbon dioxide for conventional EOR has other drawbacks in the context of unconsolidated and weakly consolidated reservoirs. For example, it is believed that gas diffusion alone by conventional carbon dioxide gas injection EOR cannot directly physically weaken the reservoir rock matrix integrity even for unconsolidated and weakly consolidated reservoirs.

It is known to those skilled in the art of heavy oil recovery that it is uneconomical to produce heavy oil (<22.3° API) and extra heavy oil (<10.0° API) by conventional mean of Darcy flow through a porous media as occurs during light to medium oil production. Heavy oil reservoirs tend to be situated at shallower depths (<1,300 meter) with lower reservoir pressures (<13,000 kPa) where the rock formation tends to be unconsolidated in nature. Light to medium oil reservoirs tend to be found at depths greater than 1,300 meter where the rock formation tends to be consolidated in nature.

The term "heavy oil" implies that the oil has high oil density because it contains higher molecular weight molecules such as long chain saturates, asphaltene, resin and/or wax which are more viscous than light and medium oil.

Heavy oil production from unconsolidated sandstone reservoirs became popular in the late 1980s, when progressive cavity pumps were employed allowing the well to produce both reservoir sand/material and fluid. Heavy oil production from unconsolidated sandstone reservoirs can use this production method, referred to as cold heavy oil production with sand (CHOPS), which involves induced sand production so that high permeability conduits called "wormholes" can grow and expand deep into the unconsolidated reservoir allowing for more reservoir oil to become accessible.

The CHOPS process involves the transport of reservoir sand and fines material along with the reservoir heavy oil and formation brine through extremely highly permeable wormholes into a wellbore. Typically, active wormholes are open channels, with high permeability, running in 100,000's to 10,000,000's Darcy, with diameters as large as 10 to 20 centimeter. As long as sand and/or loosened reservoir material is continuously dislodged and produced to surface, the wormhole network will continue to grow in length and diameter outwardly and deeper into the reservoir allowing for more reservoir oil to become accessible.

The typical sand cut of producing CHOPS wells is 5% to 40% of the production volume. Therefore, the maximum sand production translates to the maximum heavy oil recovery in unconsolidated and weakly consolidated reservoirs employing CHOPS depletion mechanisms.

Wormholes will continue to grow when the pressure difference between the reservoir pressure and the drawdown pressure at the tip of the wormhole exceeds the critical pressure gradient needed to overcome the cohesive strength of the reservoir sand matrix. The cohesive strength of an unconsolidated formation can range from about 0 to 5,000 kPa, and 5,000 to 20,000 kPa for a weakly consolidated formation. It is a common practice to aggressively drawdown a new CHOPS well to create maximum pressure gradient at the wellbore perforation to initiate sand production to form wormholes. The path and speed of wormhole growth will be dictated by the orientation of minimum cohesive strength of the unconsolidated reservoir at the wormhole leading tip point. The degree of cementation, sand grain size, capillary pressure, and oil viscosity are some factors that may affect the cohesive strength of an unconsolidated reservoir.

In situations where a growing wormhole encounters a region having a high sand matrix cohesive strength that cannot be overcome by the pressure gradient, sand failure is not possible, thus sand production ceases thereby rendering the CHOPS well uneconomical to produce. The timing and location where wormhole growth is halted may be unpredictable due to the heterogeneity of the rock formation of a reservoir.

Wormhole growth can also be halted by intentionally stopping the well production. It may be necessary to shut-in a CHOPS well for a period of time due to operational interruptions such as surface facility upsets or well servicing. Under these circumstances, it is common when a shut-in CHOPS well returns to production mode, the oil production rate is reduced when compared to the rate before well shut-in. Shutting in an active CHOPS well may halt the cascading sand production mechanism and cause settling of suspended sands and fines inside the wormholes. This may either result in plugging up of the wormholes and/or collapsing some wormholes.

Wormhole growth relies on continuous reservoir sand failure and the CHOPS process will cease when the sand and fluid flow to the wellbore is halted. There is a need for methods that enhance the recovery of oil from unconsolidated and weakly consolidated reservoirs, and that can initiate, re-initiate and restore wormhole growth for a CHOPS recovery process.

BRIEF SUMMARY

The present invention seeks to provide an oil recovery method that injects an aqueous solution or slurry of a carbonate salt into a wellbore and allows the aqueous solution or slurry of the carbonate salt to enter into a consolidated, unconsolidated or weakly consolidated reservoir. An aqueous solution of an acid is then injected into the wellbore and allowed to enter into the reservoir. The carbonate salt and the acid are allowed to react with each other and form carbon dioxide ($CO_2$) gas, inside the reservoir, which mixes with the reservoir oil and thereby reduces the viscosity of the oil within the reservoir.

It is believed that the in situ generation of carbon dioxide gas, inside the reservoir, may result in gas effervescence, during the formation of carbon dioxide gas, that causes increased well pressure and dissolution of carbon dioxide into the reservoir oil. When the present invention is applied to unconsolidated or weakly consolidated reservoirs, it is also believed that the gas effervescence causes an unconsolidated sand matrix to weaken, allowing both fluid and sand material to flow as a new starting point of new wormhole growth to the well under production drawdown.

It is also believed that the in situ generation of carbon dioxide gas, inside the reservoir, may also allow for the creation of foamy oil in heavy oil reservoirs providing a gas expansion energy to drive the oil out of the pore space of the reservoir and assisting in destabilizing the reservoir.

According to a first broad aspect of the present invention, there is provided a method for producing reservoir oil from a consolidated reservoir, the method comprising the steps of:

providing an aqueous solution of a carbonate salt;
providing an aqueous solution of an acid;
injecting, from the surface, the aqueous solution of the carbonate salt into at least one wellbore positioned inside the reservoir;
allowing the aqueous solution of the carbonate salt to enter into the reservoir;
subsequent to allowing the aqueous solution of the carbonate salt to enter into the reservoir, injecting, from the surface, the aqueous solution of the acid into the at least one wellbore positioned inside the reservoir;
allowing the aqueous solution of the acid to enter into the reservoir and contact the aqueous solution of the carbonate salt;
subsequent to allowing the aqueous solution of the acid to enter into the reservoir, shutting in the at least one wellbore;
allowing the carbonate salt in the aqueous solution of the carbonate salt and the acid in the aqueous solution of the acid to react with each other to form carbon dioxide gas;
allowing the carbon dioxide gas to mix with the reservoir oil thereby reducing viscosity of the reservoir oil;
subsequent to allowing the carbon dioxide gas to mix with the reservoir oil, opening up the at least one wellbore;
allowing the reservoir oil to flow into the at least one wellbore; and
producing to the surface the reservoir oil.

In some exemplary embodiments of the first broad aspect, the carbonate salt is sodium carbonate, sodium bicarbonate or potassium carbonate. Preferably, the aqueous solution of the carbonate salt is a saturated aqueous solution of the carbonate salt.

In some exemplary embodiments of the first broad aspect, the acid is hydrochloric acid, acetic acid, nitric acid or hydrofluoric acid.

Preferably, the at least one wellbore is shut in for 4 to 24 hours.

According to the first aspect, the formation of the carbon dioxide gas may increase reservoir pressure.

According to a second broad aspect of the present invention, there is provided a method for producing reservoir oil from an unconsolidated or weakly consolidated reservoir comprising at least one wellbore positioned inside the reservoir, the at least one wellbore having no wormholes extending therefrom, the method comprising the steps of:

providing an aqueous solution of a carbonate salt;
providing an aqueous solution of an acid;
injecting, from the surface, the aqueous solution of the carbonate salt into the at least one wellbore;
allowing the aqueous solution of the carbonate salt to enter into the reservoir;
subsequent to allowing the aqueous solution of the carbonate salt to enter into the reservoir, injecting, from the surface, the aqueous solution of the acid into the at least one wellbore;
allowing the aqueous solution of the acid to enter into the reservoir and contact the aqueous solution of the carbonate salt;
subsequent to allowing the aqueous solution of the acid to enter into the reservoir, shutting in the at least one wellbore;
allowing the carbonate salt in the aqueous solution of the carbonate salt and the acid in the aqueous solution of the acid to react with each other to form carbon dioxide gas generating an effervescence of carbon dioxide gas that disaggregates a first portion of the reservoir adjacent to the at least one wellbore;

allowing the carbon dioxide gas to mix with the reservoir oil thereby reducing viscosity of the reservoir oil;
subsequent to allowing the carbon dioxide gas to mix with the reservoir oil, opening up the at least one wellbore;
allowing the reservoir oil and the first portion of the reservoir to flow into the at least one wellbore; and
producing to the surface the reservoir oil and the first portion of the reservoir via a Cold Heavy Oil Production with Sand recovery process.

In some exemplary embodiments of the second broad aspect, the carbonate salt is sodium carbonate, sodium bicarbonate or potassium carbonate. Preferably, the aqueous solution of the carbonate salt is a saturated aqueous solution of the carbonate salt.

In some exemplary embodiments of the second broad aspect, the acid is hydrochloric acid, acetic acid, nitric acid or hydrofluoric acid.

Preferably, the at least one wellbore is shut in for 4 to 24 hours.

According to the second aspect, the method may further comprise the step of, during the step of producing to the surface the reservoir oil, generating a foamy oil within the reservoir that disaggregates a second portion of the reservoir adjacent to the at least one wellbore, which may be produced to the surface. The generation of the effervescence of the carbon dioxide gas and/or foamy oil may increase reservoir pressure.

According to a third broad aspect of the present invention, there is provided a method for producing reservoir oil from an unconsolidated or weakly consolidated reservoir comprising at least one wellbore positioned inside the reservoir, the at least one wellbore having at least one wormhole extending therefrom and that is being subjected to or has completed primary Cold Heavy Oil Production with Sand (CHOPS), the method comprising the steps of:
providing a slurry of a carbonate salt;
providing an aqueous solution of an acid;
injecting, from the surface, the slurry of the carbonate salt into the at least one wellbore;
allowing the slurry of the carbonate salt to enter into the at least one wormhole;
subsequent to allowing the slurry of the carbonate salt to enter into the at least one wormhole, injecting, from the surface, the aqueous solution of the acid into the at least one wellbore;
allowing the aqueous solution of the acid to enter into the at least one wormhole and contact the slurry of the carbonate salt;
subsequent to allowing the aqueous solution of the acid to enter into the at least one wormhole, shutting in the at least one wellbore;
allowing the carbonate salt in the slurry of the carbonate salt and the acid in the aqueous solution of the acid to react with each other to form carbon dioxide gas generating an effervescence of carbon dioxide gas that disaggregates a first portion of the reservoir adjacent to the at least one wormhole;
allowing the carbon dioxide gas to mix with the reservoir oil thereby reducing viscosity of the reservoir oil;
subsequent to allowing the carbon dioxide gas to mix with the reservoir oil, opening up the at least one wellbore;
allowing the reservoir oil and the first portion of the reservoir to flow into the at least one wellbore; and
producing to the surface the reservoir oil and the first portion of the reservoir via a CHOPS recovery process.

In some exemplary embodiments of the third broad aspect, the carbonate salt is sodium carbonate, sodium bicarbonate or potassium carbonate.

In some exemplary embodiments of the third broad aspect, the acid is hydrochloric acid, acetic acid, nitric acid or hydrofluoric acid.

Preferably, the at least one wellbore is shut in for 24 to 48 hours.

According to the third aspect, the method may further comprise the step of, during the step of producing to the surface the reservoir oil, generating a foamy oil within the reservoir that disaggregates a second portion of the reservoir adjacent to the at least one wormhole, which may be produced to the surface. The generation of the effervescence of the carbon dioxide gas and/or foamy oil may increase reservoir pressure.

According to a fourth broad aspect of the present invention, there is provided a method for removing reservoir skin damage material from a consolidated or unconsolidated reservoir comprising at least one wellbore positioned inside the reservoir, the wellbore having no wormholes extending therefrom, the method comprising the steps of:
providing an aqueous solution of a first acid, the aqueous solution of the first acid of a type and volume selected to dissolve the reservoir skin damage material;
providing an aqueous solution of a carbonate salt;
providing an aqueous solution of a second acid;
injecting, from the surface, the aqueous solution of the first acid into the at least one wellbore;
allowing the aqueous solution of the first acid to enter into the reservoir and dissolve at least some of the reservoir skin damage material thereby forming a spent solution comprising the at least some of the reservoir skin damage material;
subsequent to allowing the aqueous solution of the first acid to enter into the reservoir, injecting, from the surface, the aqueous solution of the carbonate salt into the at least one wellbore;
allowing the aqueous solution of the carbonate salt to enter into the reservoir;
subsequent to allowing the aqueous solution of the carbonate salt to enter into the reservoir, injecting, from the surface, the aqueous solution of the second acid into the at least one wellbore;
allowing the aqueous solution of the second acid to enter into the reservoir and contact the aqueous solution of the carbonate salt;
subsequent to allowing the aqueous solution of the second acid to enter into the reservoir, shutting in the at least one wellbore;
allowing the carbonate salt in the aqueous solution of the carbonate salt and the second acid in the aqueous solution of the second acid to react with each other to form carbon dioxide gas;
subsequent to allowing the carbonate salt in the aqueous solution of the carbonate salt and the second acid in the aqueous solution of the second acid to react with each other, opening up the at least one wellbore;
allowing the spent solution to flow into the at least one wellbore; and
producing to the surface the spent solution.

In some exemplary embodiments of the fourth broad aspect, the carbonate salt is sodium carbonate, sodium bicarbonate or potassium carbonate.

In some exemplary embodiments of the fourth broad aspect, the first acid is hydrochloric acid, acetic acid, nitric acid or hydrofluoric acid.

In some exemplary embodiments of the fourth broad aspect, the second acid is hydrochloric acid, acetic acid, nitric acid or hydrofluoric acid.

Preferably, the at least one wellbore is shut in for less than 2 hours.

According to the fourth aspect, the formation of the carbon dioxide gas may increase reservoir pressure.

According to a fifth broad aspect of the present invention, there is provided a method for removing reservoir skin damage material from a consolidated or unconsolidated reservoir comprising at least one wellbore positioned inside the reservoir, the at least one wellbore having no wormholes extending therefrom, the method comprising the steps of:

providing an aqueous solution of an acid, the aqueous solution of the acid of a volume greater than necessary to dissolve the reservoir skin damage material;

providing an aqueous solution of a carbonate salt;

injecting, from the surface, the aqueous solution of the acid into at the least one wellbore;

allowing the aqueous solution of the acid to enter into the reservoir;

allowing a first portion of the aqueous solution of the acid to dissolve at least some of the reservoir skin damage material thereby forming a spent solution comprising the at least some of the reservoir skin damage material, leaving a second portion of the aqueous solution of the acid as unreacted acid solution comprising part of the acid;

subsequent to allowing the first portion of the aqueous solution of the acid to dissolve the at least some of the reservoir skin damage material, injecting, from the surface, the aqueous solution of the carbonate salt into the at least one wellbore;

allowing the aqueous solution of the carbonate salt to enter into the reservoir and contact the unreacted acid solution;

subsequent to allowing the aqueous solution of the carbonate salt to enter into the reservoir, shutting in the at least one wellbore;

allowing the carbonate salt in the aqueous solution of the carbonate salt and the acid in the unreacted acid solution to react with each other to form carbon dioxide gas;

subsequent to allowing the carbonate salt in the aqueous solution of the carbonate salt and the acid in the unreacted acid solution to react with each other, opening up the at least one wellbore;

allowing the spent solution to flow into the at least one wellbore; and producing to the surface the spent solution.

In some exemplary embodiments of the fifth broad aspect, the carbonate salt is sodium carbonate, sodium bicarbonate or potassium carbonate.

In some exemplary embodiments of the fifth broad aspect, the first acid is hydrochloric acid, acetic acid, nitric acid or hydrofluoric acid.

Preferably, the at least one wellbore is shut in for less than 2 hours.

According to the fifth aspect, the formation of the carbon dioxide gas may increase reservoir pressure.

A detailed description of exemplary embodiments of the present invention is given in the following. It is to be understood, however, that the invention is not to be construed as being limited to these embodiments. The exemplary embodiments are directed to a particular application of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

Throughout the following description specific details are set forth in order to provide a more thorough understanding to persons skilled in the art. However, well known elements may not have been shown or described in detail to avoid unnecessarily obscuring the disclosure. The following description is not intended to be exhaustive or to limit the invention to the precise form of any exemplary embodiment. Accordingly, the description and drawings are to be regarded and interpreted in an illustrative, rather than a restrictive, sense.

Throughout the following description, the phrase "weakly consolidated reservoirs" should be interpreted to include reservoirs having some integrity, wherein reservoir materials such as, but not limited to, sand and rock, can be produced from the reservoirs as would be apparent to a person skilled in the art.

The solubility, oil viscosity reduction and oil swelling properties of carbon dioxide and its application to oil recovery projects are common knowledge to those skilled in the art. However, it has also long been recognized that there may be limited access to high purity carbon dioxide gas at a reasonable price.

The present invention is directed to methods for recovery of oil housed in consolidated, weakly consolidated or unconsolidated reservoirs comprising injecting an aqueous solution or slurry of a carbonate salt into a wellbore and allowing the aqueous solution or slurry of the carbonate salt to enter into the reservoir. An aqueous solution of an acid is then injected into the wellbore and allowed to enter into the reservoir. After injecting the aqueous acid solution, chase water may be injected into the wellbore to assist in moving the acid solution into the reservoir.

Exemplary methods of the present invention are preferably employed on weakly consolidated or unconsolidated reservoirs that comprise at least one wormhole or do not comprise a wormhole. Exemplary methods of the present invention may also be employed on consolidated reservoirs. Exemplary embodiments of the present invention are described herein below.

The carbonate salt and the acid are allowed to react with each other to form carbon dioxide gas, inside the reservoir, which mixes with the reservoir oil and thereby reduces the viscosity of the oil within the reservoir. The effervescence of carbon dioxide gas created inside the reservoir agitates and weakens reservoir material such as, but not limited to, sand matrix to stimulate the wormhole growth process and promote sand production.

The carbon dioxide gas created inside the confined pore space of the reservoir and/or reservoir wormholes increases reservoir pressure rapidly and forces carbon dioxide gas to dissolve into the reservoir oil. Effervescence of carbon dioxide may further accelerate the rate of carbon dioxide dissolving into the reservoir oil. The dissolved carbon dioxide may reduce oil viscosity, and induce oil swelling to reduce oil density.

In some exemplary embodiments of the present invention, after a period of soaking to allow the chemical reaction between the carbonate salt and acid to complete and the generated carbon dioxide to fully or substantially dissolve into the reservoir fluid, the well is turned back on for production with the aid of a progressive cavity pump located downhole of the wellbore. The well may be shut-in during the soaking period.

The pressure drawdown of the pump creates a rapid pressure gradient that allows the dissolved carbon dioxide to evolve back out and re-create foamy oil behavior in oil (discussed below). The expansive volume of the foamy oil weakens the reservoir sand matrix so that both reservoir sand and fluid are mobilized and flow back to the wellbore. This may occur via the wormhole paths conduced by the CHOPS process. The reservoir oil can subsequently be produced to the surface by means known to a person skilled in the art. Repetition of the methods according to the present invention may occur until production is no longer economically viable.

It is known to those skilled in the art that during CHOPS production the produced to surface oil contains trapped gas bubbles known as "foamy oil". Unlike in the production of light and medium oil, produced heavy oil contains a very low content of dissolved solution gas. During a depletion mode, the evolved solution gas does not coalesce into larger gas bubbles immediately, but rather remains entrained inside the viscous heavy oil as micro-bubbles. This causes swelling of the heavy oil and a reduction of the bulk density and viscosity of the heavy oil. The expanding micro-bubbles can induce sand production by weakening the cohesive strength of the sand matrix and allowing the oil laden sand grains to separate from the matrix and be carried away to a wellbore through permeable wormholes. The expansive nature of foamy oil also increases the energy of the solution gas drive towards the wellbore. The present invention allows for in-situ carbon dioxide generation within the reservoir wherein the carbon dioxide can re-charge the reservoir heavy oil as it dissolves in it thereby recreating the foamy oil behaviour.

In some exemplary embodiments of the present invention, the in situ carbon dioxide is derived from a chemical reaction of common baking soda or soda ash, or chemically known as sodium bicarbonate ($NaHCO_3$) and sodium carbonate ($Na_2CO_3$), respectively. Both of these carbonate salts are readily available reagents that are known to be safe to handle, easy to transport, non-flammable, non-toxic, and non-corrosive in either solid or aqueous forms under typical conditions. The solid carbonate salts can be mixed with water on site or at a central facility and then transported to a well site.

The balanced chemical equations for the reactions between sodium bicarbonate and sodium carbonate with four commonly used oilfield acids (i.e., hydrochloric acid, acetic acid, nitric acid and hydrofluoric acid) that may be employed for the present invention are illustrated below (see equations a to i). It is known to those skilled in the art that to produce the same molar amount of carbon dioxide, sodium bicarbonate requires only half the molar amount of acid and yields half the molar amount of sodium salt as compared to when using sodium carbonate. It should be noted that if a reservoir formation is known to have swelling clay issues due to presence of smectite or illite, potassium bicarbonate may be employed instead of a sodium based carbonate salt as clay stability is enhanced by potassium chloride (see equation c).

$$1NaHCO_3(aq)+1HCl(aq) \rightarrow 1NaCl(aq)+1CO_2(g)+1H_2O(l) \quad \text{a.}$$

$$1Na_2CO_3(aq)+2HCl(aq) \rightarrow 2NaCl(aq)+1CO_2(g)+1H_2O(l) \quad \text{b.}$$

$$1KHCO_3(aq)+1HCl(aq) \rightarrow 1KCl(aq)+1CO_2(g)+1H_2O(l) \quad \text{c.}$$

$$1NaHCO_3(aq)+1CH_3COOH(aq) \rightarrow 1NaCH_3COO(aq)+1CO_2(g)+1H_2O(l) \quad \text{d.}$$

$$1Na_2CO_3(aq)+2CH_3COOH(aq) \rightarrow 2NaCH_3COO(aq)+1CO_2(g)+1H_2O(l) \quad \text{e.}$$

$$1NaHCO_3(aq)+1HNO_3(aq) \rightarrow 1NaNO_3(aq)+1CO_2(g)+1H_2O(l) \quad \text{f.}$$

$$1Na_2CO_3(aq)+2HNO_3(aq) \rightarrow 2NaNO_3(aq)+1CO_2(g)+1H_2O(l) \quad \text{g.}$$

$$1NaHCO_3(aq)+1HF(aq) \rightarrow 1NaF(aq)+1CO_2(g)+1H_2O(l) \quad \text{h.}$$

$$1Na_2CO_3(aq)+2HF(aq) \rightarrow 2NaF(aq)+1CO_2(g)+1H_2O(l) \quad \text{i.}$$

Upon contact with an acid, the carbonate salt that is employed for the present invention reacts instantly with the acid causing a rapid effervescence of carbon dioxide gas along with the formation of the corresponding salt solution by-product and water. The concentrations of carbonate salt and acid and the amount of chase water employed for the present invention should be chosen to produce salinity and by-products that are compatible with the reservoir. The natural salinity of reservoir water typically ranges from 10,000 to 250,000 ppm.

Hydrochloric acid is preferably employed for the present invention since it is the most commonly used oilfield workover acid and the resulting aqueous sodium chloride by-product is common to the native saline water found in almost all oil and gas reservoirs. Practically, all subterranean reservoirs contain formation brine water of a certain salinity.

The other by-product sodium salts resulting from using acetic acid or nitric acid are also all highly water soluble and would not be damaging to a reservoir. Both sodium acetate and sodium nitrate are highly soluble in water and in some situations can be beneficial to oil-bearing reservoirs. Injection of nitrate (and nitrite) compounds into oil reservoirs is a common practice used in the oil industry to prevent and remediate souring problems (i.e., the production of hydrogen sulfide by sulfur-reducing bacteria).

The amount and rate of carbon dioxide gas generation can be controlled by the volume and/or concentration of carbonate salt and acid solutions being injected into the reservoir.

Acid corrosiveness can be controlled and minimized by limiting the acid concentration and/or employing the use of corrosion inhibitors. 5 to 15% hydrochloric acid solutions are commonly used for de-scaling and general wellbore clean-out workover. It is known to those skilled in the art that hydrochloric acid solution concentration of up to 15% can be injected downhole without adverse corrosion on steel tubing or casing. 10 to 15% hydrochloric acid solution is a suitable acid concentration to be employed for the present invention as it provides an appropriate amount of carbon dioxide gas effervescence when reacting with the carbonate salts.

Depending on the pore volume of the reservoir and the amount of in-situ generated carbon dioxide to be released, the injection volume should be accordingly designed. For example, for short radial coverage of in-situ carbon dioxide generation in either consolidated or unconsolidated reservoirs without wormholes or fractures, injecting high concentration acid solutions is preferable so that carbonate salts are quickly reacted with. For long radial coverage during in-situ carbon dioxide generation, injecting larger acid solution volumes with lower acid concentrations is preferable. As larger solution volumes are deployed, longer soak-in periods become more preferable. When larger acid solution volumes and/or lower concentrated acid solutions are deployed, longer soak-in periods become more preferable.

Lower acid concentrations allow for lower rates of reaction between the acid with the carbonate salt, allowing for more injected acid to penetrate farther out into the reservoir. It is believed that an excessively strong effervescence of carbon dioxide gas may temporary hinder the distance that an injected acid solution can advance into the reservoir. This is more of a concern for consolidated reservoirs where matrix rock permeability is not as high as in unconsolidated reservoirs and less of a concern for unconsolidated reservoirs with existing wormholes. For unconsolidated reservoirs with existing wormholes that behave like open pipes, injected acid can reach a wormhole's frontal tip with little resistance just like in any two phase flow in a pipe.

It is known to those skilled in the art that the solubility of carbonate salts in water is a near linear correlation with temperature and that higher temperature water dissolves more carbonate salt. In some exemplary embodiments involving consolidated reservoirs, it may be advantageous to mix a carbonate salt with higher temperature water to achieve a more concentrated saturated solution as only aqueous carbonate salt solution is been injected. Highly concentrated saturated carbonate salt solutions may be beneficial when short radial coverage of in-situ carbon dioxide generation is desired or when the present invention is employed in wells having poor injectivity properties.

In some exemplary embodiments, mixing the carbonate salt with water under ambient field temperatures is acceptable as long as it is above freezing temperatures. If the present invention is employed during winter conditions, it is preferable to mix the carbonate salt in water indoors or while applying auxiliary heating to achieve solution temperatures of about 21° C. or higher. In some exemplary embodiments, this may be achieved by mixing the carbonate salt in water indoors and then transporting the required volume of carbonate salt solution to the field. At 25° C., a saturated solution contains about 9.5% sodium bicarbonate by weight (i.e., 10.5 kilogram of sodium bicarbonate per 100 kilogram of water). In some exemplary embodiments where a carbonate salt/water slurry is injected into an unconsolidated reservoir with wormholes, maximum solubility is not required as it is preferable to create a filter cake of carbonate salt solid from the slurry stream. In such cases, the aqueous solution only serves as a carrying agent for the carbonate salt solids.

Figure 1A:
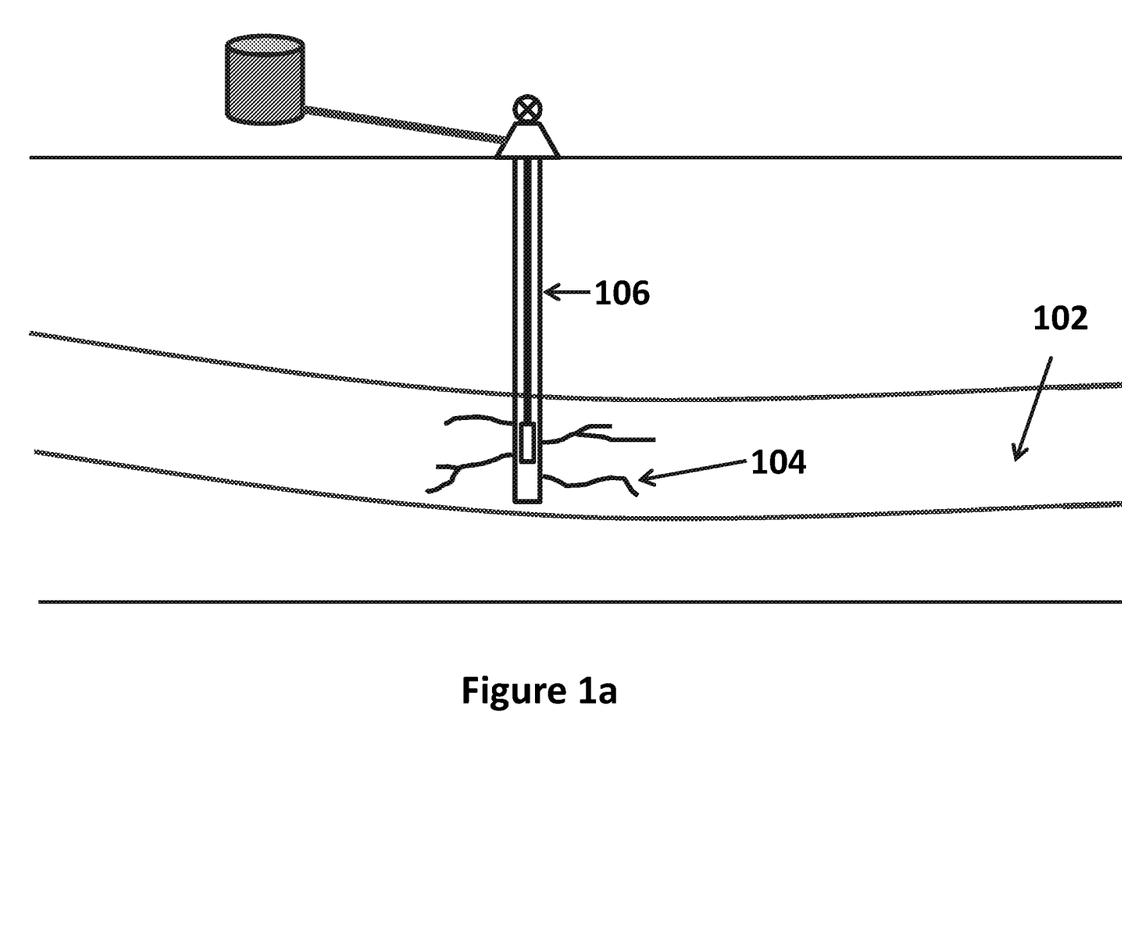
FIG. 1a is a simplified schematic view of a CHOPS well with a limited wormhole network wherein exemplary methods of the present invention may be employed.
Figure 1B:
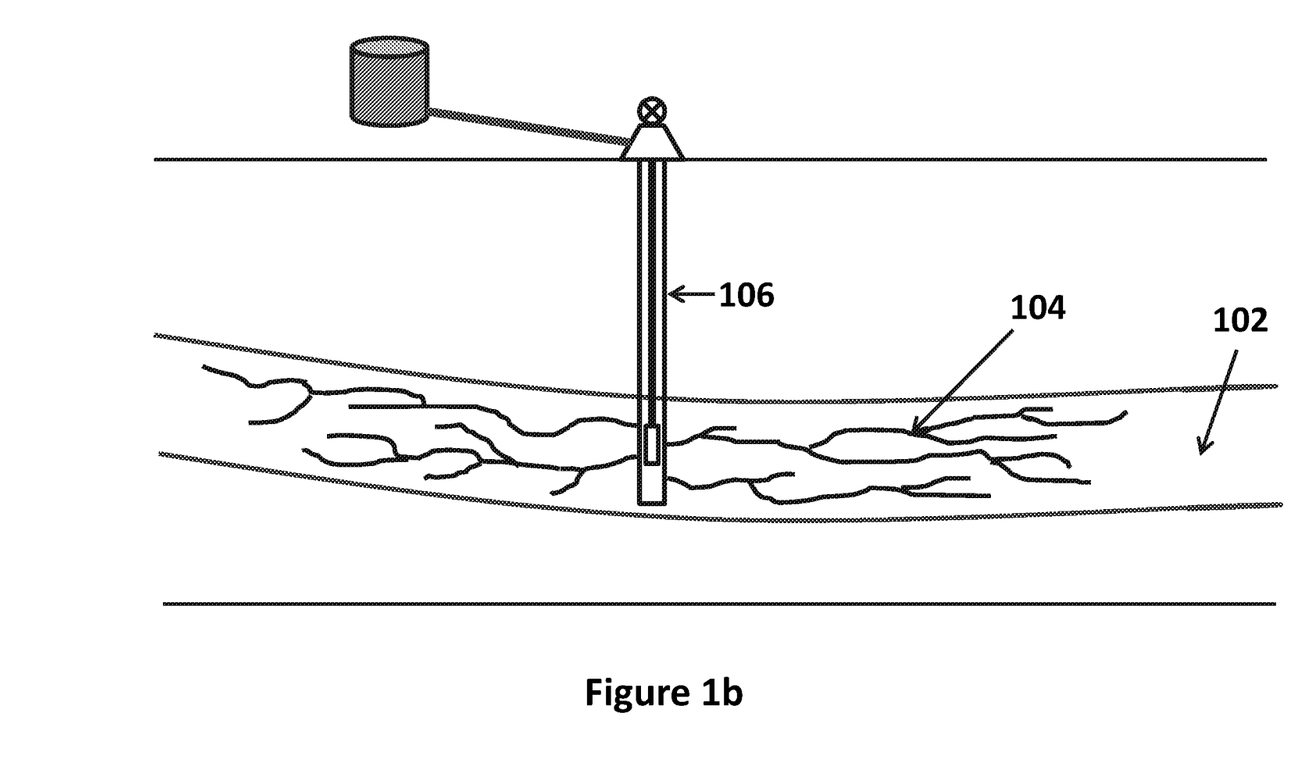
FIG. 1b is a simplified schematic view of a CHOPS well with a mature wormhole network wherein exemplary methods of the present invention may be employed.

Turning to FIGS. 1a and 1b, a conventional CHOPS well is illustrated wherein exemplary methods of the present invention may be employed. FIG. 1a illustrates a CHOPS well with a limited wormhole network, while FIG. 1b illustrates a CHOPS well with a mature wormhole network. In both FIGS. 1a and 1b, a reservoir 102 is shown having at least one wormhole 104 that is being subjected to or has completed primary CHOPS production. A wellbore 106 is shown, that is in communication with the reservoir 102, having at least one wormhole 104 extending therefrom.

Figure 2:
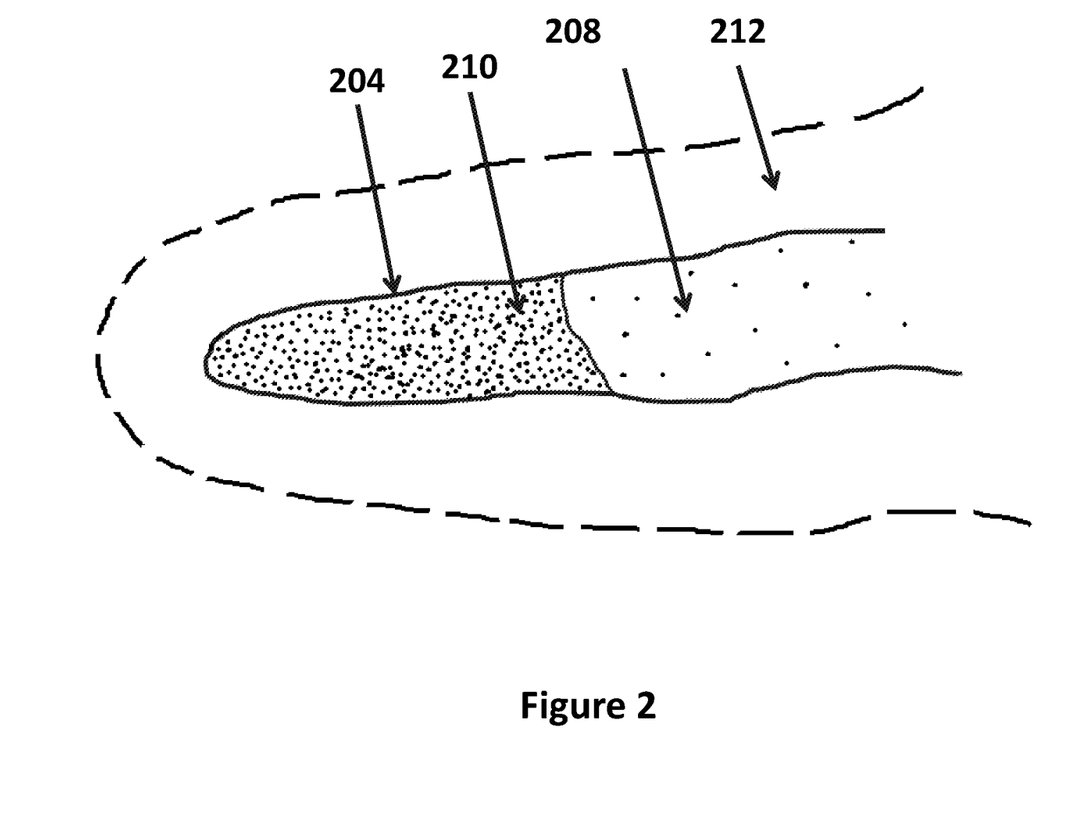
FIG. 2 is a partial sectional view of a first exemplary embodiment.

Turning to FIG. 2, a first exemplary embodiment of the present invention is partly illustrated wherein an unconsolidated reservoir comprises at least one wormhole 204. It is preferable to inject a slurry of carbonate salt 208 because the solids in the slurry 208 can be easily carried into the wormhole 204 where it can accumulate as a filter cake 210 at the frontal tip endpoint while the carbonate salt filtrate 212 escapes into the matrix sand pore spaces. It is not required to pack the entire wormhole 204 with the filter cake 210 of carbonate salt 208 to achieve maximum matrix sand agitation and to re-initiate wormhole growth at its frontal tip end. Carbon dioxide gas generation derived from the carbonate salt solution behind the filter cake 210 and filtrate in front of the wormhole 204 allows for destabilization of the sand matrix and dissolution of carbon dioxide into the oil.

It should be noted that when exemplary methods of the present invention are employed on weakly consolidated or unconsolidated reservoirs that do not comprise a wormhole, it is preferable to inject a saturated aqueous solution of carbonate salt as the solids of a slurry would not be able to pass through the rock matrix of the reservoir.

Figure 3:
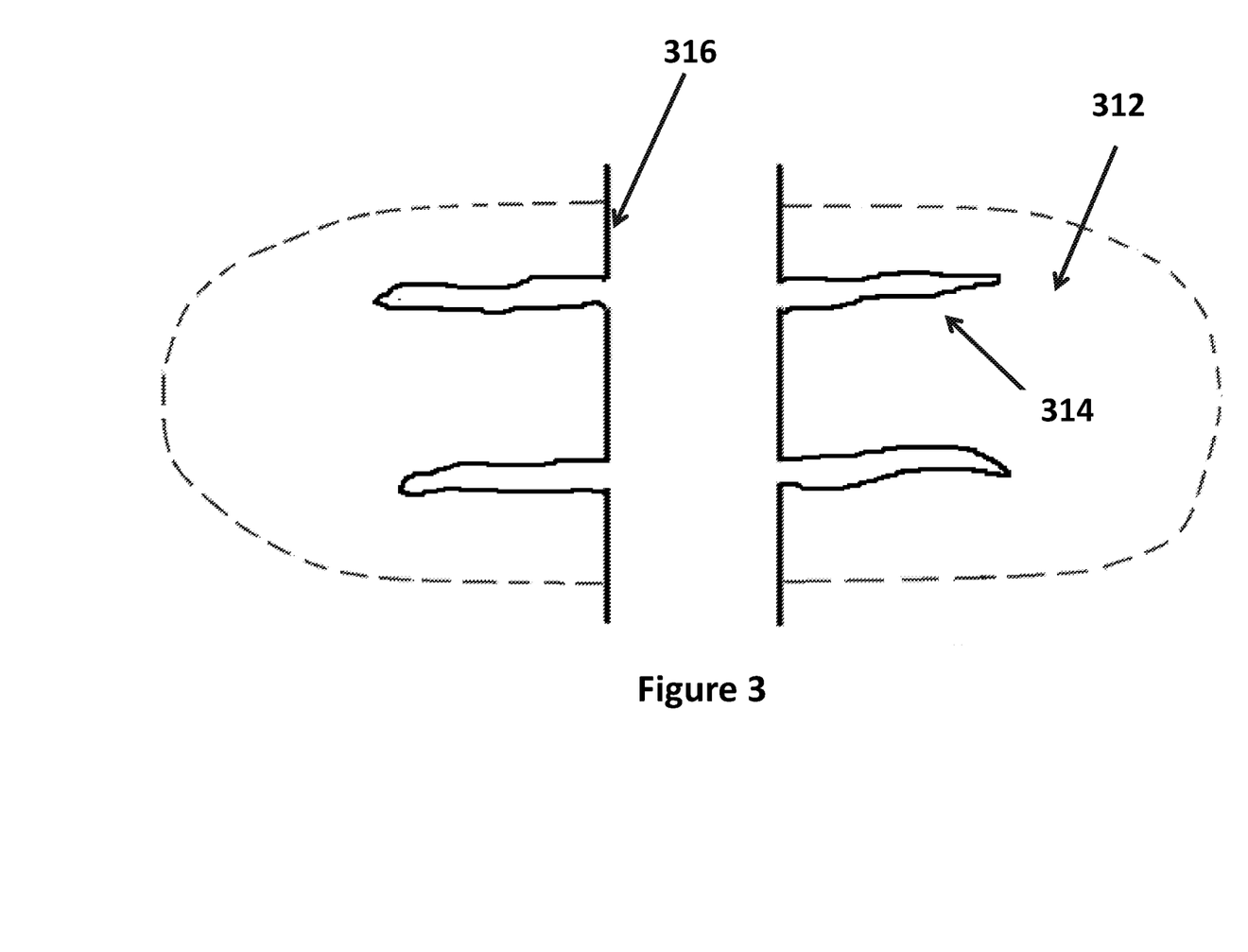
FIG. 3 is a partial sectional view of a second exemplary embodiment.

As shown in FIG. 3, in a second exemplary embodiment comprising a consolidated reservoir without fractures or wormholes, a saturated aqueous solution of carbonate salt 312 is preferably employed as any solids of a slurry would not able to pass through the rock matrix beyond the well perforation 314 from the well casing 316.

An exemplary method of the present invention is described herein below that allows for the injection of a slurry of a carbonate salt into a wellbore that is allowed to enter into an unconsolidated sand reservoir comprising at least one wormhole. An aqueous acid solution is then injected into the wellbore and allowed to enter into the unconsolidated reservoir. The carbonate salt and the acid are allowed to react with each other and form carbon dioxide gas inside the reservoir.

The first step involves selecting a wellbore, in communication with the reservoir, having at least one wormhole extending therefrom and that is being subjected to or has completed primary CHOPS production.

A carbonate salt is then injected, from the surface, into a wellbore positioned inside the reservoir. The carbonate salt is preferably injected as a slurry. It is not required to fill up the entire volume of the at least one wormhole volume with the carbonate salt slurry. The carbonate salt slurry is then allowed to enter into the reservoir and the at least one wormhole therein.

An aqueous acid solution, preferably a hydrochloric acid solution, is provided and then injected, from the surface, into the wellbore positioned inside the reservoir. The hydrochloric acid aqueous solution is then allowed to enter into the reservoir and the at least one wormhole therein. Chase water is then injected into the wellbore to assist in moving the acid solution into the reservoir.

Some of the carbonate salt and acid, while in the reservoir, are allowed to react and form carbon dioxide gas. Upon contact with the acid, the carbonate salt reacts instantly with it causing a rapid effervescence of carbon dioxide gas along with the formation of the corresponding salt solution by-product and water. It is believed that the effervescence of carbon dioxide within the confined space of the at least one wormhole causes increased well pressure, unconsolidated sand matrix weakening, wormhole integrity destabilization, and dissolution of carbon dioxide into the reservoir oil.

Subsequent to allowing the aqueous solution of the acid to enter into the at least one wormhole and contact the slurry of the carbonate salt, the wellbore is shut in to allow for the generated carbon dioxide to soak into the reservoir oil. For some exemplary embodiments that employ a heavy oil well in an unconsolidated reservoir with at least one wormhole, the shut-in period is preferably 24 to 48 hours to allow for rock matrix destabilization and the carbon dioxide to dissolve into the heavy oil.

The shutting in of the wellbore may be required to allow the generated carbon dioxide to remain inside the reservoir under pressure and dissolve in the heavy oil. After an appropriate shut-in period, the wellbore is then opened up to allow pressurized oil and water within the treated zone to flow into the wellbore. As further discussed below, upon opening up the well, the carbon dioxide laden foamy oil and liberated carbon dioxide gas that was dissolved in water facilitate the movement of reservoir fluids, mobile sand and fines to the wellbore through the wormholes.

Figure 4:
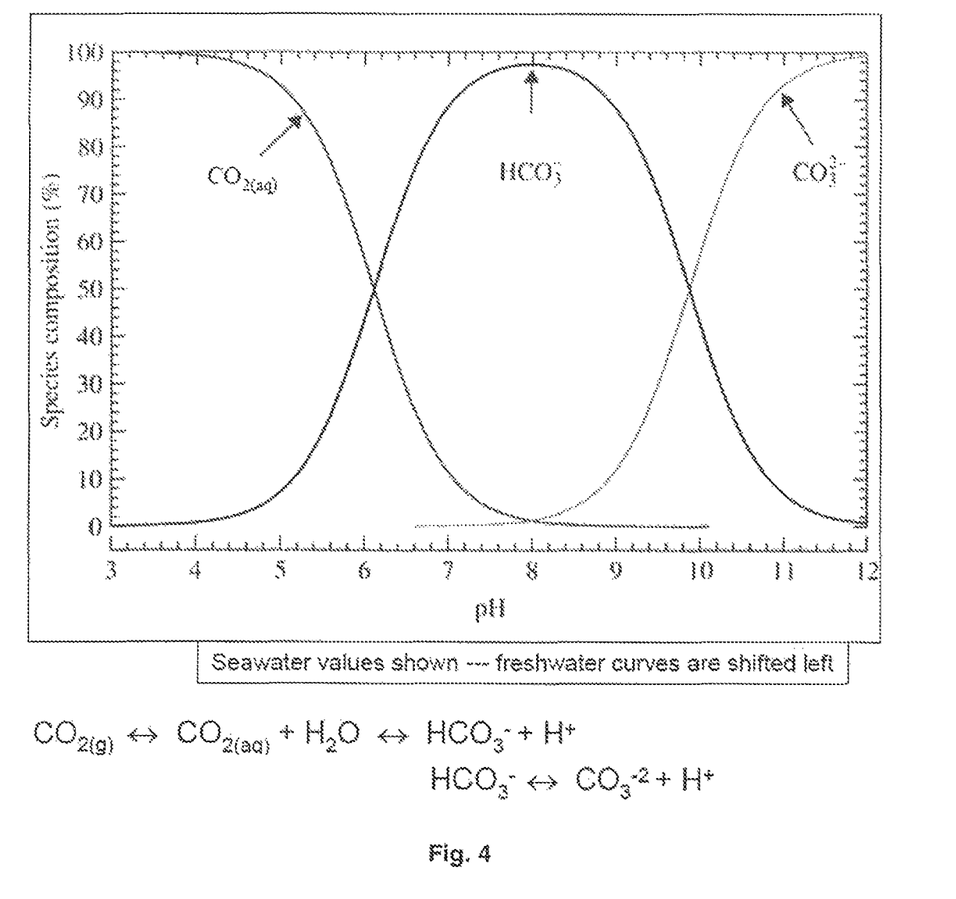
FIG. 4 is a graph illustrating the equilibrium of carbon dioxide speciation in an acidic system.
Figure 5:
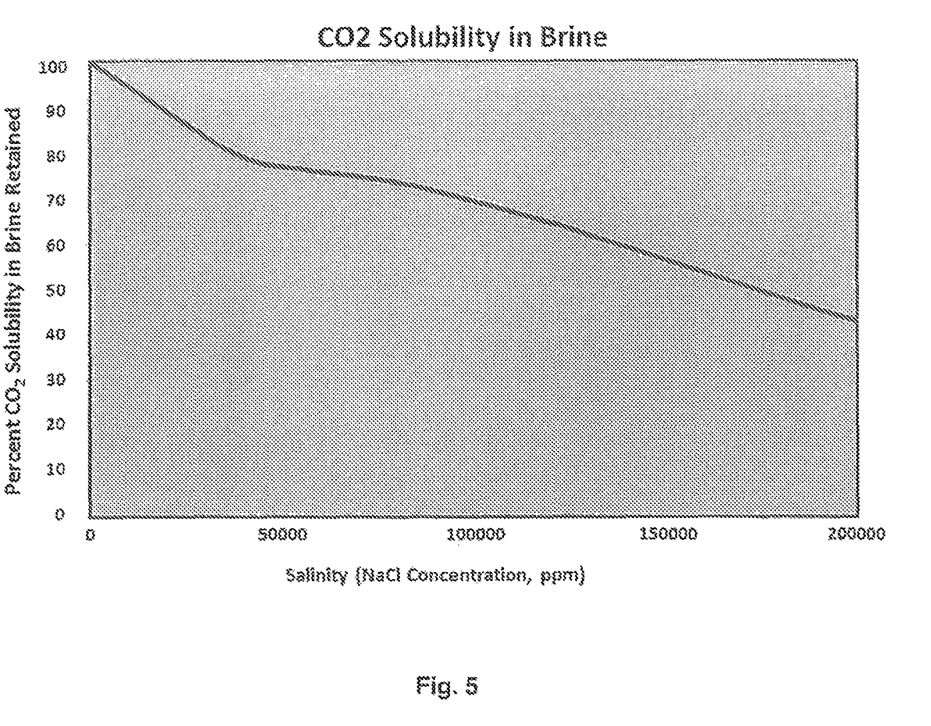
FIG. 5 is a graph illustrating the dependence of carbon dioxide solubility on sodium chloride concentration.

Although some of the generated carbon dioxide will dissolve into the surrounding water, the carbon dioxide solubility of the surrounding water is minimized due to the water acidity resulting from the injected acid. This is due to the carbon dioxide speciation dependence on pH as illustrated in FIG. 4. The solubility of carbon dioxide in water is further suppressed in the presence of high sodium chloride concentrations as illustrated in FIG. 5.

It should be noted that any carbon dioxide that remains in solution can act as a temporary storage source of carbon dioxide gas that is ultimately released from solution as the well pressure drops during a production cycle. The released carbon dioxide gas can provide additional gas expansion drive energy for light and medium oil recovery. It is well known to those skilled in the art that gas solubility decreases with partial pressure reductions of that gas.

After the desired soak time in a heavy oil system, the wellbore is opened up and the drawdown allows for reservoir sand and heavy oil to flow into the wellbore. During production, the dissolved carbon dioxide in the heavy oil attempts to liberate from the heavy oil creating foamy oils (as described above). It is known to those skilled in the art that the created foamy oil, unique to heavy oil, occupies more volume as compared to the oil it is derived from, thus its formation can provide gas expansion energy to drive the oil out of the pore space of the reservoir sand. The formation of foamy oils also destabilizes the unconsolidated reservoir sand so that oil, water and sand flow together through the wormhole into the wellbore.

It is believed that employment of the present invention allows for both (1) effervescence of carbon dioxide gas during its formation, and (2) heavy oil volume increase during foamy oil formation. Both of these phenomena assist in agitating and weakening an unconsolidated reservoir sand matrix and wormhole capillary integrity. This allows for further sand production. Sand production is indicative of wormhole growth which allows for more reservoir oil to become accessible.

The reservoir oil and sand is subsequently produced to the surface by means known to a person skilled in the art. The method of the third embodiment of the present invention can be repeated without damaging the well or reservoir. Repetition of the method may occur until it is no longer economically viable.

It should be noted that for some exemplary embodiments, akin to those described for the first embodiment of the present invention, that employ a heavy oil well in an unconsolidated reservoir wherein little to no cumulative sand production has occurred, a shut-in period of about 4 to 24 hours is sufficient.

For some exemplary embodiments that employ an oil well in a consolidated reservoir, the shut-in period should be about 4 to 24 hours after acid injection and allowing the aqueous solution of the acid to enter into the reservoir and contact the aqueous solution of the carbonate salt. The shutting in of the treated wellbore may be required to allow the generated carbon dioxide to remain inside the reservoir under pressure and not escape to surface. The in-situ generated carbon dioxide may dissolve into the oil and water in the reservoir forming swelling oil and carbonic acid. After an appropriate shut-in time, the wellbore is then opened up allowing the pressurized oil and water within the treated zone to flow into the production wellbore and be produced with the assistance of liberated carbon dioxide and the expansive force of swelled up oil. The dissolved carbon dioxide in the reservoir water (as carbonic acid) is liberated back as carbon dioxide gas which can assist in pushing the lower viscosity oil to the wellbore.

Furthermore, for some exemplary embodiments that employ an oil well in an unconsolidated or consolidated reservoir, the shut in period should be no longer than 2 hours when a reduction of skin damage is desired (as described herein below).

It should also be noted that the wellbore can also be shut in for periods longer than described above without damaging the wellbore or the reservoir, however, the increased reservoir pressure created by employing the present invention may dissipate with time within the reservoir.

Figure 6:
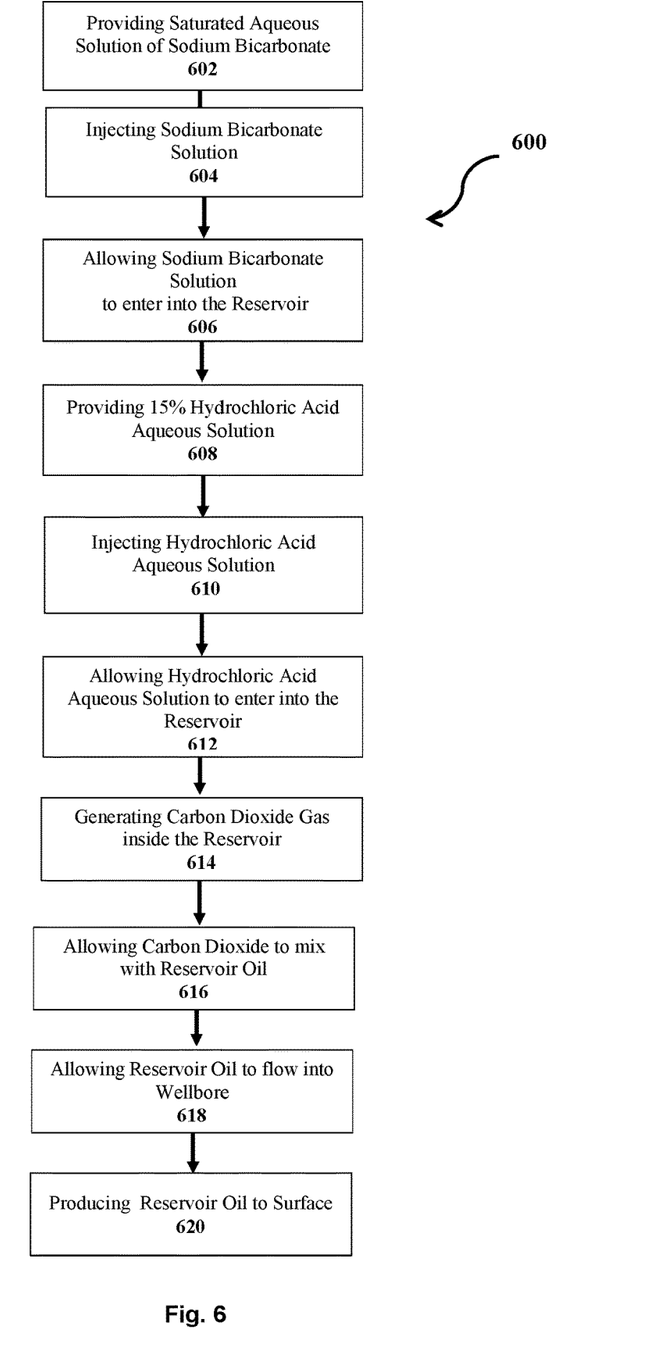
FIG. 6 is a flow chart illustrating a third exemplary embodiment.

Turning to FIG. 6, a third embodiment of the present invention is illustrated. A non-limiting method example 600 is illustrated in the flowchart and described herein to illustrate the potential amounts of the components employed for the present invention. The method allows for the injection of an aqueous solution of sodium bicarbonate into a wellbore that is then allowed to enter into a consolidated or unconsolidated reservoir with no existing wormholes. An aqueous solution of hydrochloric acid is then injected into the wellbore and allowed to enter into the reservoir. The sodium bicarbonate and the hydrochloric acid are allowed to react with each other and form carbon dioxide gas inside the reservoir.

The first step 602 involves providing a saturated aqueous solution of sodium bicarbonate, prepared by mixing one tonne of solid sodium bicarbonate salt with 10.5 $m^3$ of fresh water at standard conditions (i.e., approx. 25° C.). Alternatively, slightly more water may be employed if saline field water is used.

The saturated aqueous solution of sodium bicarbonate is then injected at step 604, from the surface, into a wellbore positioned inside a reservoir. The aqueous solution of sodium bicarbonate is then allowed to enter into the reservoir at step 606.

2.5 m³ of 15% hydrochloric acid aqueous solution is provided at step 608 and then injected at step 610, from the surface, into the wellbore positioned inside the reservoir. The hydrochloric acid aqueous solution is then allowed to enter into the reservoir at step 612.

2.5 m³ of chase water (i.e., corresponding to a typical well tubing string column volume) may then be injected into the wellbore to assist in moving the hydrochloric acid solution into the reservoir. However, it should be noted that, preferably, the injected chase water volume should be at least the volume of the working string volume that delivered the acid solution.

Akin to the embodiments described above, the wellbore is shut in subsequent to allowing the aqueous solution of the acid to enter into the reservoir and contact the aqueous solution of the carbonate salt.

Some of the injected sodium bicarbonate and hydrochloric acid, while in the reservoir, are allowed to react with each other and form stoichiometric 523.8 kg of carbon dioxide gas (at step 614). Upon contact with hydrochloric acid, the sodium bicarbonate reacts instantly with the acid causing a rapid effervescence of carbon dioxide gas along with the formation of the corresponding salt solution by-product and water. In cases where the present invention is applied to a consolidated reservoir, the effervescence of carbon dioxide gas does not compromise the consolidated reservoir integrity, or alter the rock mechanics of the natural fractures or the proppant used for artificial fracturing. A stoichiometric amount of 0.21 m³ by-product water and 695.7 kg sodium chloride are also formed from the reaction of sodium bicarbonate and hydrochloric acid.

Some of the formed carbon dioxide gas mixes with the reservoir oil at step 616. This results in the viscosity of the oil within the reservoir being reduced, allowing for some of the reservoir oil to flow, at step 618, from the reservoir into the wellbore. Akin to the embodiments described above, the wellbore is opened up subsequent to allowing the carbon dioxide gas to mix with the reservoir oil.

The reservoir oil is subsequently produced, at step 620, to the surface by means known to a person skilled in the art. The method of the third embodiment of the present invention can be repeated without damaging the well or reservoir. Repetition of the method may occur until it is no longer economically viable.

The concentrations of sodium bicarbonate and hydrochloric acid and the amount of chase water employed for the present invention should be chosen to produce a salinity that is compatible with the reservoir. In the above example, the load water salinity (without mixing with formation water) will be 5.27% by weight or about 53,000 ppm of sodium and chloride ions which are very similar to native salinity of the most targeted oil reservoirs.

In cases where the third embodiment of present invention is applied to a consolidated reservoir, it is believed that the in situ generation of carbon dioxide gas, inside the reservoir, may improve oil flow and recovery by reducing oil viscosity, causing oil swelling and/or reducing the residual oil saturation by reducing the interfacial tension between the oil saturation and the reservoir rock grain surface. In cases where the third embodiment of present invention is applied to a weakly consolidated or unconsolidated reservoir, it is believed that employment of the present invention allows for both (1) effervescence of carbon dioxide gas during its formation, and (2) oil volume increase during foamy oil formation. Both of these phenomena assist in agitating and weakening an the reservoir sand matrix and wormhole capillary integrity allowing for further sand production.

It is known to those skilled in the art that enhancing well productivity by removing formation skin by matrix acidizing is a common remedy. Acidization using a specific acid can be employed to dissolve undesirable material in a well that may be causing permeability impairment or skin damage. Skin damage can occur in either consolidated reservoirs or unconsolidated reservoirs wherein no wormholes are present. Both acetic acid and hydrochloric acid are suitable acids that can be employed for removing calcite and dolomite scaling, calcium and zinc hydroxide, and common gelling agents such as guar and hydroxyethyl cellulose. If a formation contains a high calcium sulphate content, a carbonate salt solution such as sodium carbonate should first be employed for converting the calcium sulfate into calcium carbonate before acidization is commenced. Hydrofluoric acid can also be used for removing skin damage caused by excess formation clay and siliceous fine minerals, or solids left behind by drilling mud or cement operations. To stabilize immobile fine clay materials, potassium chloride can be used as a clay stabilizer so that the immobile fine clay materials do not become mobilized and plug up the reservoir or block the pore throats therein. It is known to those skilled in the art, however, that after acidizing a wellbore and reservoir, skin damage can still be present because (1) there is insufficient natural reservoir pressure to expel all the load fluid out of the formation; (2) insufficient acid was employed; or (3) the acid used allows for precipitation of new solid material.

It is believed that skin damage removal can be facilitated by an in situ generation of carbon dioxide inside a reservoir after a skin damage reduction acidization procedure has been conducted. In situ generated carbon dioxide gas can increase the reservoir pressure of a skin damaged region allowing for enhancement of the cleanout step by accelerating the discharge of load fluid back to a wellbore, thus potentially increasing well productivity and oil recovery.

Exemplary methods akin to the embodiments described above can be applied to a well after a skin damage reduction acidization procedure has been conducted allowing for an in situ generation of carbon dioxide inside a reservoir. It is preferable that the well is shut in for less than 2 hours during the skin damage reduction acidization procedure. Preferably, an aqueous solution, and not a slurry, of the carbonate salt is employed. The well is shut in for another period that is less than 2 hours during the in situ generation of carbon dioxide process akin to that described for the embodiments above. The shutting in of the treated well is desired to maximize the generation of effervescence of carbon dioxide gas and keep the reservoir under pressure. After appropriate shut-in time has passed, the well is then opened up, allowing pressurized load fluid within the treated zone to be produced. Shut-in periods are typically short so that localized pressures do not decrease by dissipating out into the reservoir. Since the targeted zone is smaller for skin damage reduction treatments, the focus is to maximize pressure differences during the depressurization cycle upon opening up the well.

In some exemplary embodiments of the present invention, excess acid is initially used during a skin damage reduction acidization procedure thereby providing a remnant acid solution inside a reservoir after the acidization procedure has been conducted. An aqueous solution of a carbonate salt is provided and injected, from the surface, into at least one wellbore positioned inside the reservoir. Preferably, the aqueous solution of a carbonate salt is saturated. The aqueous solution of the carbonate salt is then allowed to enter into the reservoir and contact the remnant acid solution inside reservoir. The well is shut in for period that is preferably no longer than 2 hours. The carbonate salt and the acid react with each other allowing for an effervescence of carbon dioxide gas that increases reservoir pressure and loosens up any unwanted solids or precipitation material inside the reservoir. The well is opened up, and any load fluid and solid skin materials are allowed to flow into the at least one wellbore and produced to the surface. The flow of load fluid and solid skins materials into the at least one wellbore may be facilitated with a bottom hole pump. It should be noted that for such exemplary methods, the acid and bicarbonate salt injection steps are essentially reversed to those of the other exemplary embodiments described above.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above.

Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

What is claimed is:

1. A method for producing reservoir oil from a consolidated reservoir, the method comprising the steps of:
    providing an aqueous solution of a carbonate salt;
    providing an aqueous solution of an acid;
    injecting, from the surface, the aqueous solution of the carbonate salt into at least one wellbore positioned inside the reservoir;
    allowing the aqueous solution of the carbonate salt to enter into the reservoir;
    subsequent to allowing the aqueous solution of the carbonate salt to enter into the reservoir, injecting, from the surface, the aqueous solution of the acid into the at least one wellbore positioned inside the reservoir;
    allowing the aqueous solution of the acid to enter into the reservoir and contact the aqueous solution of the carbonate salt;
    subsequent to allowing the aqueous solution of the acid to enter into the reservoir, shutting in the at least one wellbore;
    allowing the carbonate salt in the aqueous solution of the carbonate salt and the acid in the aqueous solution of the acid to react with each other to form carbon dioxide gas;
    allowing the carbon dioxide gas to mix with the reservoir oil thereby reducing viscosity of the reservoir oil;
    subsequent to allowing the carbon dioxide gas to mix with the reservoir oil, opening up the at least one wellbore;
    allowing the reservoir oil to flow into the at least one wellbore; and
    producing to the surface the reservoir oil.

2. The method of claim 1 wherein the carbonate salt is selected from the group consisting of sodium carbonate, sodium bicarbonate and potassium carbonate.

3. The method of claim 1 wherein the aqueous solution of the carbonate salt is a saturated aqueous solution of the carbonate salt.

4. The method of claim 1 wherein the acid is selected from the group consisting of hydrochloric acid, acetic acid, nitric acid and hydrofluoric acid.

5. The method of claim 1 wherein the shutting in of the at least one wellbore is for 4 to 24 hours.

6. The method of claim 1 wherein the formation of the carbon dioxide gas increases reservoir pressure.

* * * * *